United States Patent Office 3,647,683
Patented Mar. 7, 1972

3,647,683
HYDROCARBON SWEETENING WITH $H_2O_2$-CONTAINING MICELLAR DISPERSIONS
Joe T. Kelly, deceased, late of Littleton, Colo., by La Verne S. Kelly, executrix, 5713 Morning Glory Lane, Littleton, Colo. 80120
No Drawing. Filed Nov. 28, 1969, Ser. No. 880,959
Int. Cl. C10g 27/04, 27/08
U.S. Cl. 208—196
6 Claims

ABSTRACT OF THE DISCLOSURE

Hydrogen peroxide is solubilized in a micellar dispersion, i.e. stable systems containing hydrocarbon, aqueous medium, and surfactant. The hydrogen peroxide-containing micellar dispersion is then admixed with any liquid media in which hydrogen peroxide is to be used as a reactant or catalyst to effect intimate contact and dispersion of the hydrogen peroxide within the liquid media. In this manner sour hydrocarbon streams are sweetened, for instance.

BACKGROUND OF THE INVENTION

Field of the invention

This invention relates to chemical reactions in which hydrogen peroxide is used either as a reactant or catalyst. More particularly, this invention relates to hydrogen peroxide reactions where the reactant media does not normally solubilize or effectively disperse the hydrogen peroxide.

Hydrogen peroxide has found a wide number of uses including bleaching, oxidation of organic and inorganic compounds including the manufacture of organic and peroxide chemicals, and use as a space propellant. It has also found use in the petroleum industry in the sweetening of sour oils containing oxidizable sulfur compounds.

(2) Description of the prior art

Although the use of hydrogen peroxide in various reactions is well known in the prior art, a distinct disadvantage exists from the inability of hydrogen peroxide to sufficiently disperse in many reactive medias with the result that necessary intimate contact for reaction is not achieved. This adverse phenomenon is particularly apparent in oleophilic systems such as hydrocarbon refinery streams, in which hydrogen peroxide is only minutely soluble under ordinary conditions. This advantage of the prior art is overcome by utilizing the method of the present invention in which hydrogen peroxide is incorporated into a micellar dispersion which in turn acts as a carrier for dispersing the $H_2O_2$. These micellar dispersions are well known in the art as miscible flooding agents in the secondary and tertiary recovery of oil, as oil well stimulants, etc.

SUMMARY OF THE INVENTION

Briefly described, the invention comprises a method for incorporating hydrogen peroxide into a liquid reactive media in which hydrogen peroxide is not normally dispersible to any substantial degree. This is accomplished by introducing the hydrogen peroxide into the liquid media in the form of a micellar dispersion, and admixing the micellar dispersion into the liquid media for dispersion of the hydrogen peroxide. Although additional components may be present, the micellar dispersion generally includes the following components: hydrocarbon, aqueous media, and surfactant as well as the hydrogen peroxide solubilized therein.

The invention is particularly suitable in the polymerization of styrene, acrylonitrile and other polymerization reactions and particularly in the sweetening of refinery streams containing oxidizable impurities, e.g. organo mercaptans. Other uses include those disclosed in Kirk-Othmer, Encyclopedia of Chemical Technology, v. 11, pp. 391–411, and references disclosed therein, such as in bleaching, oxidation of organic and inorganic compounds, manufacture of peroxides, as a space propellant etc.

PREFERRED EMBODIMENTS OF THE INVENTION

(1) Micellar dispersion carrier

The term "micellar dispersion" as used herein is meant to include micellar solutions, "micro-emulsions" [Schulman and Montagne, Annals of the New York Academy of Sciences, 92, pages 366–371 (1961)], "transparent" emulsions (Blair, Jr. et al., United States Pat. No. 2,356,205) and micellar dispersions taught by C. G. Sumner, Clayton's, The Theory of Emulsions and Their Technical Treatment, 5th Edition, pages 315–320 (1954). Examples of useful micellar dispersions include those taught in United States Pat. Nos. 3,254,714; 3,275,075; 3,301,325; 3,307,628; 3,330,344; and 3,348,611. The micellar dispersion can be oil-external or water-external, preferably oil-external for the purposes of this invention.

The micellar dispersion is comprised of hydrocarbon, aqueous medium phase, at least one surfactant, and solubilized hydrogen peroxide. One or more cosurfactants (also identified as cosolvents, cosolubilizers) and semipolar organic compounds) are useful in the dispersion. Also, electrolytes are useful in the dispersions. The micellar dispersion is, for purposes of this invention, relatively stable dispersion and can show some Tyndall effect, but generally does not. Also, the micellar dispersion can contain other additives, e.g. corrosion and scale inhibitors, bactericides, etc. Examples of useful dispersions include those containing, by volume, from about 4% to about 85% hydrocarbon; from about 5 to about 90% water, from about 4 to about 50% surfactant, from about 0.01 to about 20% or more by volume of cosurfactant and from about 0.001 or less up to about 5% or more by weight of electrolyte in the aqueous phase. From preferably less than about 30%, and more preferably from about 0.01 to about 25%, and most preferably from about 0.05 to about 20% by weight of $H_2O_2$ is also present in the aqueous phase.

(2) Hydrocarbons

Examples of useful hydrocarbons include crude oil, partially refined fractions thereof, e.g. side cuts from crude columns, crude column overheads, gas oils, kerosene, heavy naphthas, naphthas, straight-run gasoline, and liquefied petroleum gases, refined fractions of crude oil halogenated hydrocarbons. Pure hydrocarbons are also useful, e.g. paraffinic compounds including liquefied petroleum gases, propane, pentane, heptane, decane, dodecane, etc.; cycloparaffin compounds including cyclohexane, etc.; aryl compounds including monocyclic and polycyclic compounds and substituted products thereof including toluene, alkyl phenols, etc. and combinations of the hydrocarbons taught herein. Based on economics, the preferred hydroacrbon is one locally available and is crude oil. The unsulfonated hydrocarbons (e.g. heavy vacuum gas oils) in petroleum sulfonates is also useful.

(3) Aqueous medium

The aqueous medium can be soft, brackish, or brine water. Preferably, the water is soft but it can contain small amounts of salts.

The aqueous phase also contains the hydrogen peroxide in solution. Because pure or nearly pure $H_2O_2$ is quite reactive and unstable, the $H_2O_2$ is usually added to the micellar dispersion or a component thereof in aqueous form, preferably from 0 to 90% solutions, more preferably from 0 to 40% solutions. The amount of $H_2O_2$ that can be incorporated into the micellar dispersion can be varied by the particular selection of surfactant(s) used. In general, a higher percentage of $H_2O_2$ can be incorporated by using a more hydrophilic surfactant.

(4) Surfactant

Useful surfactants include the various nonionic, cationic, and anionic surfactants. Examples of surfactants can be found in U.S. 3,254,714 to Gogarty et al. Among tate; anionic exemplified by hexadecylnaphthalene sulfate, N-methyltaurine oleamide, triethanolamine myristate; anionic exemplified by hexadecylnaphthalene sulfonate, sodium glyceryl monolaurate sulfate, dihexyl sodium succinate; and cationic exemplified by ditetradecyl dimethyl ammonium chloride, hexadecyl trimethylammonium chloride and p-toluidine sulfate laurate. Preferably, the surfactant is a petroleum sulfonate, also known as alkaryl sulfonates or alkaryl naphthenic sulfonates. The sulfonate can contain less than 60 or up to 100% active sulfonate. Examples of preferred surfactants are the sodium and ammonium petroleum sulfonates having an average equivalent weight within the range of from about 360 to about 520, and more preferably from about 400 to about 470. The surfactant can be a mixture of low and high average equivalent weight sulfonates or a mixture of different surfactants.

(5) Cosurfactants

Examples of useful cosurfactants include alcohols, amino compounds, esters, aldehydes and ketones and containing from 1 up to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and secondary hexanols. Concentrations of from about 0.1% to more than about 10% by volume are preferred and more preferably from about 0.2% to about 3%. Mixtures of two or more cosurfactants are also useful.

(6) Electrolytes

Electrolytes useful within the micellar dispersions include inorganic bases, inorganic acids, inorganic salts, organic bases, organic acids, and organic salts. These electrolytes include those being strongly or weakly ionized. Preferably, the electrolytes are inorganic bases, inorganic acids, and inorganic salts, examples include sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in United States Pat. No. 3,330,344. The type and concentration of preferred electrolyte will depend on the hydrocarbon phase, aqueous phase, surfactant, cosurfactant, and operating conditions, e.g. temperature.

Selection of particular components for the micellar dispersion will vary according to the particular reactive media in which $H_2O_2$ solubility is desired, as well as the availability of materials, etc. The design of the micellar dispersion is within the skill of those having ordinary familiarity with the art.

(7) Additional components

In addition to the various components of the micellar dispersion mentioned hereinabove, various other additives may be employed and are often desirable. These include inter alia, hydrogen peroxide stabilizers, basic compounds (e.g. NaOH) and hydrogen peroxide catalysts, i.e., compounds which enhance the reactivity of hydrogen peroxide with the particular reactive media involved. The stabilizers are normally used to reduce the decomposition of the hydrogen peroxide to the lowest possible level. Any of the commonly known stabilizers may be used, examples of which include 8-hydroxyquinoline, sodium pyrophosphate, and various stannates such as stannic oxide (from sodium stannate). Generally as the $H_2O_2$ concentration increases the quantity of stabilizer required decreases. In alkaline solutions, alkali metal silicates are excellent stabilizing agents.

When the hydrogen peroxide is used to oxidize either an inorganic or an organic compound, various catalysts enhance the oxidizing reaction and are well known in the art. For instance, those catalysts taught in Hydrogen Peroxide, W. C. Schumb et al., Reinhold Publishing Corp., New York, 1955 and Mechanism of Oxidation of Organic Compounds, W. A. Waters, Methuen & Co., Ltd., London, 1964, p. 39 are often used. Particularly useful catalysts include salts of copper and their corresponding hydrated species such as $CuCl_2.2H_2O$. This latter type of catalyst, when present in catalytic amounts, is particularly effective when oxidizing organic mercaptans to the corresponding disulfide directly in refinery streams or similar hydrocarbon streams containing the same.

(8) Time

For any reactive liquid media in which the $H_2O_2$-containing micellar dispersion is dispersed, contact times will depend upon the particular reaction involved, but in general will vary from 0.01 to 200, preferably from 0.01 to 100 hours.

(9) Pressure

The pressure is not narrowly critical unless the particular reaction requires it. The pressure should not be so low or so high as to induce coalescense of the micellar dispersion or otherwise break it. Preferred pressures are from 0.01 to 1000 atmospheres, more preferably from 0.1 to 100 atmospheres.

(10) Examples

The components of the micellar dispersion are admixed with agitation in any suitable manner, such as by stirring, shaking, rotary stirring, or pumping to form the stable micellar dispersion. By stable is meant that the dispersions are thermodynamically stable, appearing to be single phased and substantially transparent. Equilibrium tends toward further dispersion of the interval phase rather than coagulation or coalescence. These characteristics distinguish micellar dispersions from emulsions. The resulting dispersion may then be admixed with the particular reactive liquid in which hydrogen peroxide is desired to be dispersed. As an illustration, micellar dispersion containing soublized hydrogen peroxide is metered through a pump and into a sour hydrocarbon refinery stream containing organic mercaptans through a mixing valve and from there the stream is sent to product storage. Sweetening of the sour stream will then take place, either in storage or transit, or both. Contact times of at least about 0.1 hour, preferably at least about 5 hours, more preferably at least 10, but less than 200 hours are required to oxidize the organic mercaptan and thereby sweeten the stream. Further processing includes a drying step before the product is ready for commercial use.

The following further illustrations are set forth as illustrative of preferred embodiments of the present invention but are not meant to limit it in any way. Note that streams containing appreciable amounts of hydrogen sulfide, when present, may be scrubbed prior to processing to remove hydrogen sulfide. Percents are by weight unless otherwise specified.

EXAMPLE I

Improving the color of contaminated automobile transmission oil

A solution is prepared by mixing 20 g. of Shell Chemical Company petroleum sulfonate (a sodium alkaryl sulfonate with an average equivalent weight in the range of 360 to about 520) into 80 ml. of kerosene. To this is added with stirring, 10 ml. of tap water and 10 ml. of 30%-aqueous $H_2O_2$. A two-phase system results on mixing, but on addition of 2.5 ml. of isopropyl alcohol, a clear, highly fluid micellar dispersion results. This dispersion is added to 12 ml. (10 g.) of automobile transmission oil containing Fe and Fe compound contaminants and 10 ml. of 50% aqueous HCl in a 500 ml. flask with agitation. A single phase mixture results. 2 g. $NH_2OH \cdot HCl$ is added slowly, producing an exothermic reaction with evolution of gas. The pH of the mixture is adjusted to 4–6 by addition of $NH_4OH$. The color of the final mixture remains stable for months, showing removal of the contaminants.

EXAMPLE II

Improving the color and odor of alkylated benzene detergents

A second micellar dispersion is made up in the same way as in Example I with the exception that the $H_2O_2$ is made basic (pH 11) by addition of 3 drops of 10% NaOH. 50 ml. 98% $H_2SO_4$ is incorporated into the micellar dispersion and added to a black detergent alkylate prepared by alkylating benzene with polypropylene in the presence of an $AlCl_3$-HCl catalyst. After slight agitation at room temperature, the mixture of dispersion and alkylate is allowed to stand and within about 5 minutes the color turns to a light yellow. After percolation through Attapulgus clay the product is substantially colorless and odorless.

EXAMPLE III

Nonstaining synthetic rubber formulation

Another micellar dispersion is made up exactly as in Example II with the exception that 10 ml. of 3% $H_2O_2$ is used in place of the 10 ml. $H_2O$ and 10 ml. 30% $H_2O_2$ and only 1.5 ml. of isopropylalcohol is used. This micellar dispersion is added to 1000 ml. of a rubber preparation consisting of 64% 19:16 butadiene-styrene latex containing dithiocarbamate. A few drops of dilute $CuSO_4$ as indicator is added. Latex samples removed from the mixture show no discoloration by the indicator, showing the effective oxidation of the dithiocarbamate. The treated $H_2O_2$ latex (65 parts) is compounded with potassium oleate (.15 part) natural rubber (35 parts), sulfur (2.35 parts), 2,2'-methylene bis (4-ethyl-6-tert-butylphenoy) (1 part), $TiO_2$ (20 parts), Zn mercaptobenzothiazole and Monastral blue BS (0.05 part). A foam is cast in a mold 0.2 inch deep and cured 15 minutes in steam, removed from the mold and dried for two hours at 65° C. Samples of the foam kept in contact with the human skin for 48 hours were not stained.

EXAMPLE IV

$H_2O_2$ catalyzed polymerization of acrylonitrile

A micellar system is made up by dissolving 10 g. of Shell petroleum sulfonate in 40 ml. of kerosene, adding 10 ml. of basic 30% $H_2O_2$ (made basic with 2 drops of 10% NaOH), mixing with 2 ml. of isopropyl alcohol and 0.03 g. of $CuCl_2 \cdot 2H_2O$. This micellar system is admixed with 100 g. acrylonitrile, 200 g. $HCONMe_2$, 1.31 g. ascorbic acid and 0.47 g. $H_3BO_3$ at 60° C. under nitrogen atmosphere. 300 ml. $H_2O$ is added and after 5 hours without stirring, polyacrylonitrile is recovered from the mixture and dried at 60° C. and 50 mm. pressure.

EXAMPLE V

Sweetening hydrocarbon streams containing isobutylmercaptan 2 ml. of the micellar dispersion of Example IV is added to 35 ml. of a kerosene fraction containing 0.07% isobutylmercaptan. At first, the solution has a sour odor. The micellar dispersion readily solubilizes in the sour kerosene. The dispersion is shaken vigorously for 25 seconds to insure homogeneity and allowed to stand for 96 hours in storage. At the end of this period, the odor of the treated kerosene solution is sweet and analysis reveals that the mercaptan concentration is reduced to 5 p.p.m.

EXAMPLE VI

Sweetening hydrocarbon streams containing isobutylmercaptan

The micellar dispersion of Example IV is used except that one half the amounts of sodium hydroxide and copper catalyst are used. The resulting solution is used in various proportions to sweeten a similar kerosene fraction to that in Example V, sour the isobutyl mercaptan. Various quantities of micellar dispersion are added to 100 ml. of the sour kerosene and mixed as in Example V. Stoichiometric excess is preferred. The results are shown in the accompanying table.

| | Ml. of micellar dispersion | Excess of $H_2O_2$ stoichiometry | P.p.m. mercaptan sulfur |
|---|---|---|---|
| Sample: | | | |
| 1 | None | | 752 |
| 2 | 1 | 2 | 377 |
| 3 | 3 | 6 | 231 |
| 4 | 6 | 12 | 60 |

After standing 40 hours, the mercaptan sulfur had been reduced as shown in the table. Sample 4 is sweet to smell after 12 hours. By contrast, when 100 ml. of kerosene is mixed vigorously for 15 minutes and allowed to stand with the quantity of basic 30% $H_2O_2$ and $CuCl_2 \cdot 2H_2O$ used in Sample 4 of the table, the mercaptan content is reduced to only 554 p.p.m.

MODIFICATIONS OF THE INVENTION

It should be understood that the invention is capable of a variety of modifications and variations which will be made apparent to those skilled in the art by a reading of the specification and which are to be included within the spirit of the claims appended hereto.

What is claimed is:

1. A process for oxidizing organic mercaptan impurities in a liquid hydrocarbon stream containing said impurities comprising:
    (a) forming a stable hydrogen peroxide-containing micellar dispersion comprising hydrocarbon, aqueous medium, hydrogen peroxide and surfactant capable of dispersing the components, and
    (b) admixing said hydrogen peroxide-containing micellar dispersion with said liquid hydrocarbon media so that the hydrogen peroxide becomes dispersed through said hydrocarbon media and oxidizes said impurities.

2. The process of claim 1 wherein the liquid hydrocarbon media is kerosene containing an organic mercaptan.

3. The process of claim 2 wherein a stoichiometric excess of hydrogen peroxide is utilized.

4. The process of claim 1 wherein a catalyst is incorporated into the micellar dispersion to catalyze the reaction between hydrogen peroxide and said impurities.

5. The process of claim 4 wherein said catalyst is hydrated cupric chloride.

6. The process of claim 1 wherein the micellar dispersion contains, by volume, from about 4 to about 85% hydrocarbon, from about 5 to about 98% water, from about 4 to 50% surfactant, and from about 0 to about 30% hydrogen peroxide.

References Cited

UNITED STATES PATENTS

| | | | |
|---|---|---|---|
| 2,552,399 | 5/1951 | Browder | 208—204 |
| 2,593,761 | 4/1952 | Johnstone | 208—189 |
| 2,641,570 | 6/1953 | Richards et al. | 208—204 |
| 2,744,054 | 5/1956 | Pieters | 208—196 |
| 2,891,002 | 6/1959 | Bowers | 208—189 |
| 3,413,307 | 11/1968 | Heimlich et al. | 208—196 |

DELBERT E. GANTZ, Primary Examiner

G. J. CRASANAKIS, Assistant Examiner

U.S. Cl. X.R.

208—195

PO-1050
(5/69)

UNITED STATES PATENT OFFICE
CERTIFICATE OF CORRECTION

Patent No. 3,647,683      Dated Mar. 7, 1972

Inventor(s) Joe T. Kelly (Dec'd) LaVerne S. Kelly, executrix

It is certified that error appears in the above-identified patent and that said Letters Patent are hereby corrected as shown below:

| | |
|---|---|
| Col. 1, line 50: | "advantage" should read --disadvantage- |
| Col. 2, line 31: | "cosolubilizers)" should read --cosolubilizers-- |
| Col. 3, lines 15-22: | Should read: --can be found in U.S. 3,254,714 to Gogarty et al. Among these are the nonionic exemplified by diethyleneglycol sulfate, N-methyl-taurine oleamide, triethanolamine myristate; anionic exemplified by hexadecylnaphthalene sulfonate, sodium glyceryl monolaurate sulfate, dihexyl sodium succinate; and cationic exemplified by ditetradecyl dimethyl ammonium chloride, hexadecyl trimethylammonium chloride and p-toluidine sulfate laurate. Prefer- -- |

Signed and sealed this 18th day of July 1972.

(SEAL)
Attest:

EDWARD M. FLETCHER, JR.
Attesting Officer

ROBERT GOTTSCHALK
Commissioner of Patents